(12) United States Patent
Moulsley et al.

(10) Patent No.: US 6,795,420 B1
(45) Date of Patent: Sep. 21, 2004

(54) RADIO COMMUNICATION SYSTEM

(75) Inventors: Timothy J. Moulsley, Caterham (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 466 days.

(21) Appl. No.: 09/631,359

(22) Filed: Aug. 2, 2000

(30) Foreign Application Priority Data

Aug. 5, 1999 (GB) .............................................. 9918349

(51) Int. Cl.$^7$ .................................................. H04Q 7/24
(52) U.S. Cl. ..................... 370/338; 455/452.1; 455/455; 455/517; 370/230; 370/329
(58) Field of Search ................. 455/507, 428, 455/434, 466, 450, 455, 516, 517, 407, 545; 370/230, 235, 236, 252, 329, 335, 342, 349, 441, 338, 428

(56) References Cited

U.S. PATENT DOCUMENTS

| | | | | |
|---|---|---|---|---|
| 5,307,348 A | * | 4/1994 | Buchholz et al. | 370/348 |
| 5,533,019 A | * | 7/1996 | Jayapalan | 370/352 |
| 5,666,348 A | * | 9/1997 | Thornberg et al. | 370/230 |
| 5,734,645 A | | 3/1998 | Raith et al. | 370/329 |
| 6,038,223 A | * | 3/2000 | Hansson et al. | 370/329 |
| 6,163,533 A | * | 12/2000 | Esmailzadeh et al. | 370/342 |
| 6,236,646 B1 | * | 5/2001 | Beming et al. | 370/335 |
| 6,259,724 B1 | * | 7/2001 | Esmailzadeh | 375/143 |
| 6,381,229 B1 | * | 4/2002 | Narvinger et al. | 370/328 |
| 6,442,153 B1 | * | 8/2002 | Dahlman et al. | 370/342 |
| 6,625,138 B2 | * | 9/2003 | Karna et al. | 370/342 |
| 6,633,558 B1 | * | 10/2003 | Cho et al. | 370/348 |
| 6,643,275 B1 | * | 11/2003 | Gustafsson et al. | 370/328 |

FOREIGN PATENT DOCUMENTS

| | | | | |
|---|---|---|---|---|
| EP | 0 993 215 A1 | * | 4/2000 | H04Q/7/38 |
| WO | WO9913600 | | 3/1999 | H04B/7/26 |

OTHER PUBLICATIONS

N. Umeda et al: "Idles–Signal Casting Multiple Access with Partial Echo (ICMA–PE) Formobile Packet Communications" Electronics & Communications in Japan Part I–Communications, vol. 77, No. 4, Apr. 1, 1994, pp. 92–102.

* cited by examiner

*Primary Examiner*—Charles Appiah
(74) *Attorney, Agent, or Firm*—Dicran Halajian

(57) ABSTRACT

A radio communication system has a random access channel for the transmission of data (214) from a secondary station to a primary station. Such a channel is intended for use by secondary stations having data (214) to transmit to a primary station while not actually engaged in a call. Before the transmission of its data (214), a secondary station transmits a message (302) that provides information on the length of the data transmission (214), and may include format information relating to the data (214). This scheme is particularly effective when combined with a scheme signaling availability of random access channel resources, for example by use of an availability (AV) message (402). In this case, a primary station can signal future availability of resources that are currently in use.

12 Claims, 3 Drawing Sheets

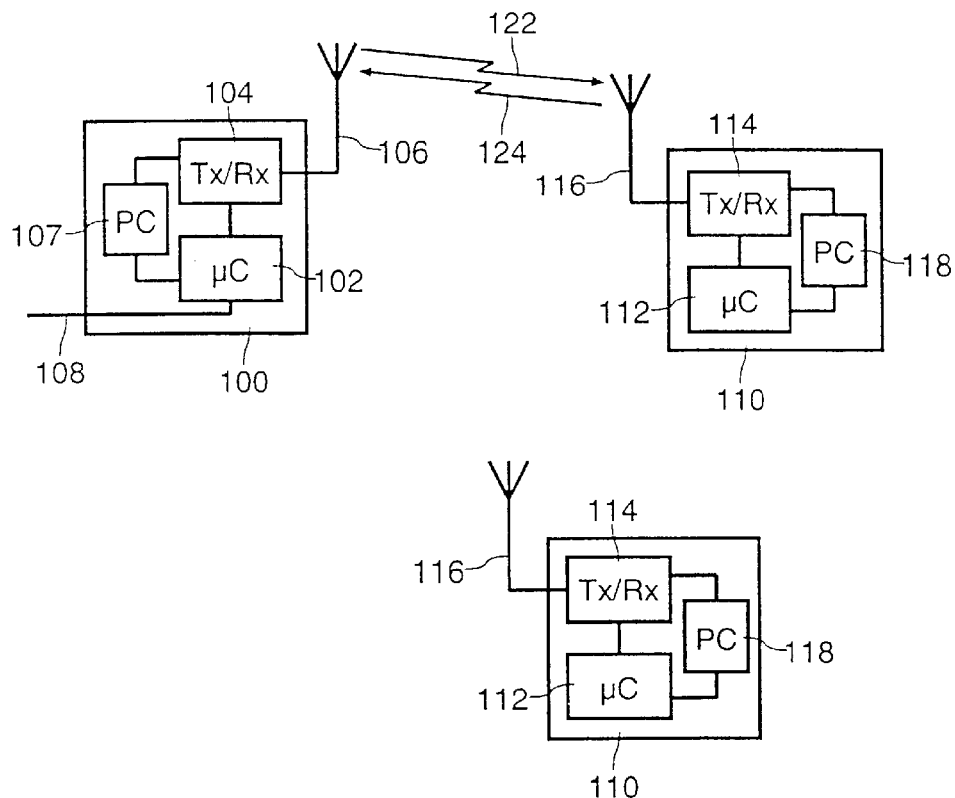
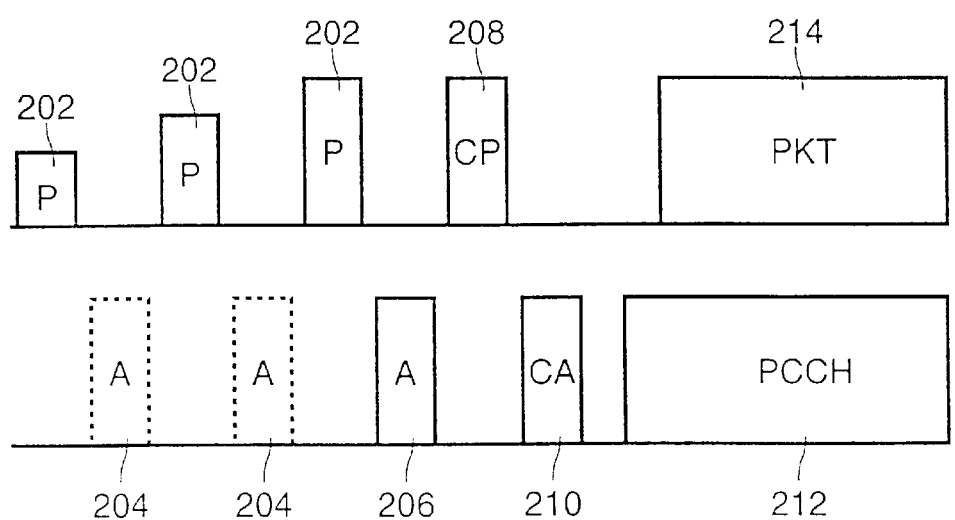

RADIO COMMUNICATION SYSTEM

BACKGROUND OF THE INVENTION

1. Field of the Invention

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specifications the term random access channel refers to the logical channel on which random access transmissions take place, which would typically consist of a number of distinct physical channels.

2. Description of the Related Art

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a scheme being developed for UMTS, there are a number of random access packet channels available to a MS. A request for access to a packet channel sent by the MS is encoded with a randomly-chosen signature, which corresponds to a packet channel resource. If a suitable channel is available for use, the BS allocates it to the requesting MS.

SUMMARY OF THE INVENTION

An object of the present invention is to provide a random access channel having improved resource utilization.

According to a first aspect of the present invention there is provided a radio communication system having a random access channel for the transmission of data from a secondary station to a primary station, wherein the secondary station has means for transmitting, before the transmission of the data, a message including an indication of the quantity of data to be transmitted and the primary station has means for determining from the received message when the data transmission will end.

According to a second aspect of the present invention there is provided a primary station for use in a radio communication system having a random access channel for the transmission of data from a secondary station to the primary station, wherein means are provided for receiving from the secondary station, before the transmission of the data, a message including an indication of the quantity of data to be transmitted, and for determining from the received message when the data transmission will end.

According to a third aspect of the present invention there is provided a secondary station for use in a radio communication system having a random access channel for the transmission of data to a primary station, wherein means are provided for transmitting, before the transmission of the data, a message including an indication of the quantity of data to be transmitted.

According to a fourth aspect of the present invention there is provided a method of operating a radio communication system having a random access channel for the transmission of data from a secondary station to a primary station, characterised by the secondary station transmitting, before the transmission of the data, a message including an indication of the quantity of data to be transmitted, and by the primary station determining from the received message when the data transmission will end. dr

BRIEF DESCRIPTION OF THE DRAWINGS

Embodiments of the present invention will now be described, by way of example, with reference to the accompanying drawings, wherein:

FIG. 1 is a block schematic diagram of a radio communication system;

FIG. 2 illustrates a basic random access packet channel scheme;

In the drawings the same reference numerals have been used to indicate corresponding features.

DETAILED DESCRIPTION OF THE INVENTION

Figure 3:
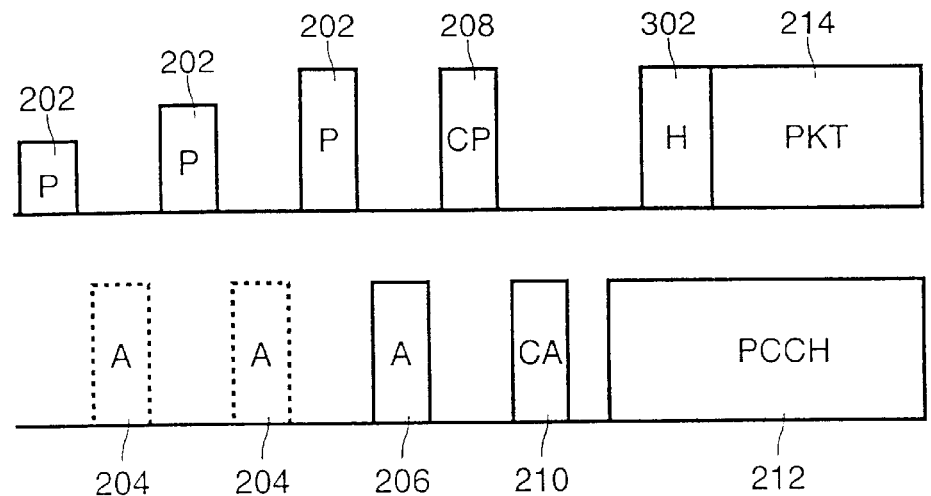
FIG. 3 illustrates an enhanced random access packet channel scheme having a packet header.

Referring to FIG. 1, a radio communication system comprises a primary station (BS) 100 and a plurality of secondary stations (MS) 110. The BS 100 comprises a microcontroller ($\mu$C) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature randomly chosen from a set of 16 possible signatures, at a low power level in a particular access slot. A signature is a signal characterised by its scrambling code and channellization code modulated by a specific bit sequence. A mutually orthogonal set of signatures can be obtained by defining a set of mutually orthogonal bit sequences for the modulation. Hence, a different set of signatures can be obtained by changing the scrambling code or the channellization code (i.e. the physical channel), or by using a different mutually orthogonal set of bit sequences. Alternatively, a larger set of signatures may be defined in such a way as to have low cross correlations, rather than strict orthogonality. Although the present specification refers to sets of 16 signatures, different implementations may use sets having different numbers of signatures.

In this basic scheme, the choice of preamble signature for encoding the access preamble 202 determines the physical channel requested by the MS 110, with each preamble signature corresponding to a limited number of uplink and downlink channels. If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might typically be 1 ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

As well as informing the MS 110 that its preamble 202 has been received, the acknowledgement 206 may be positive, to signal that the requested channels are free, or negative, to signal that they are in use and access is denied to the MS 110. A negative acknowledgement (NACK) may be indicated by the BS 100 inverting the phase of the signature (with respect to some reference or pilot signal). Alternatively, some of the signatures used by the BS 100 for acknowledgement may also be used as a NACK.

The BS 100 will only transmit one acknowledgement for each access slot, however many preambles 202 were transmitted. One basis for the selection could be to acknowledge the preamble 202 received with the highest power. The initial power level at which a MS 110 transmits the preamble 202 is typically determined by the MS 110 using open loop power control, so that a MS 110 is not at a disadvantage compared to another MS 110 nearer to the BS 100. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase follows the transmission of an, acknowledgement 206 which indicated that the requested channels were free. Each MS. 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelization code), or alternatively the set of signatures may be shared between access and contention resolution phases. The BS 100 then issues a contention resolution acknowledgement (CA) 210 corresponding to the selected preamble 208, for example that received with the highest power, which acknowledgement 210 enables the MS 110 to transmit its data. Hence, if more than one MS 110 selected the same access preamble 202 the chance of the same contention resolution preamble 208 also being selected is small.

After this contention resolution phase, the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

A problem with the basic scheme described above is that the MS 110 does not provide any information to the BS 100 about the length of the data packets 214 that it will transmit. The BS 100 therefore has to detect the end of transmission by the MS 110 using blind detection, for example by detecting the position of a correctly decoded CRC (Cyclic Redundancy Check). A further source of inefficiency with the basic scheme is that format information relating to the packet is broadcast concurrently with the data packets 214, even if it does not change during transmission of the packets 214. The format information may for example include details of error control coding and puncturing applied to the data, as well as details of multiplex arrangements if there is more than one transport channel contributing to the packet.

An improved scheme in accordance with the present invention, which solves the above problem, is illustrated in FIG. 3. Before the MS 110 transmits the data packets 214 it transmits a packet header (H) 302, which contains information on the length of the packets 214. The presence of the header 302 reduces the complexity of the BS 100, which no longer has to make a blind estimate to determine the end of the data packets 214.

The header 302 also improves resource utilization in a number of ways. Firstly, the BS 100 can stop transmission of the PCCH 212 at the known end of the data packets 214, rather than having to continue its transmission until the end of the data packets 214 is detected. Secondly, the BS 100 can reassign packet channel resources as soon as they become available, without the extra delay caused by looking for the end of the data packets 214. Thirdly, the BS 100 can pre-assign a packet channel to a MS 110 if it is known that the channel will be available by the time the MS 110 has completed the access and contention resolution phases.

Knowledge of the end time of the transmission of data packets 214 by the MS 110 also improves ARQ (Automatic Repeat reQuest) performance. This is because the BS 100 would otherwise have some difficulty in differentiating between the normal end of a packet (requirng no retransmission) and significantly corrupt reception (requiring retransmission). It would also be possible for the BS 100 to signal the required retransmissions at the end of the packet transmissions and keep the channel allocated for these retransmissions. However, this behaviour conflicts with the pre-assignment of channels by the BS 100 and therefore may not be preferred.

The efficiency of the system is further improved if the MS 110 also transmits in the header 302 the format information relating to the data packets 214. This information no longer has to be transmitted on a control channel for the duration of the data packets 214, thereby reducing the load on the control channel. Other information could also be included in the header, for example a checksum for the data packets 214 to enable the BS 100 to confirm their correct reception.

Figure 4:
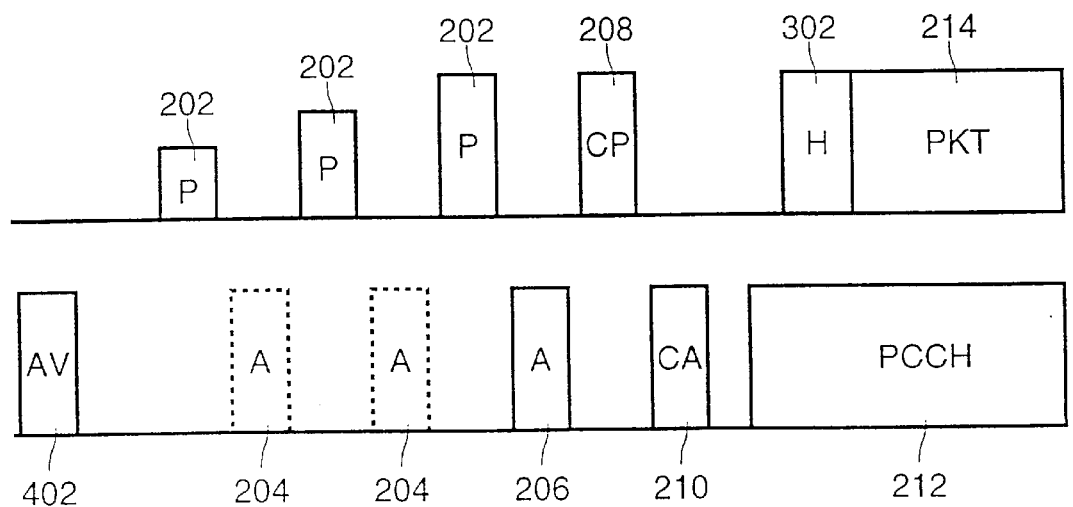
FIG. 4 illustrates a further enhanced random access packet channel scheme having a packet channel availability message.

Further advantages of a scheme in accordance with the present invention are found in conjunction with an improved scheme in which the availability of packet channel resources is signalled by the BS 100. One such scheme, disclosed in more detail in our co-pending UK patent application 9921548.5 (our reference PHB 34390), combined with the scheme of the present invention, is illustrated in FIG. 4. In this combined scheme, the BS 100 repeatedly broadcasts a packet channel availability (AV) message 402, which informs a MS 110 about the resources currently available. Broadcasting the AV message 402 once per frame is a reasonable compromise between downlink overhead and delay, since the overall transmission delay will be dominated by the time taken to transmit the data packets 214, typically a few frames.

This and other similar schemes solve the problem that a MS 110 may be denied access to a packet channel resource corresponding to its selected preamble signature, even though other suitable resources may be available, making it likely that a MS 110 will spend significant time waiting for a resource to become available. When combined with the scheme of the present invention, as illustrated in FIG. 4, the BS 100 use the AV message 402 to signal availability of a packet channel resource which will become available by the time that the signalling and any subsequent access attempts are made, even though it is not available at the time of the AV message 402. Hence the packet channel resource can be used more efficiently because the periods during which no MS 110 is transmitting on a particular packet channel are reduced in length.

A disadvantage of a scheme in accordance with the present invention is that the length of the message transmitted by the MS 110 (now including both the header 302 and data packets 214) is slightly increased. However, the amount of extra data to be transmitted is minimal. For example, to signal the length of the data packets 214 a MS 110 would preferably indicate the number of frames of data. Hence a 4 bit message could indicate up to 16 frames of data, which corresponds to 9.6 kb at the lowest bit rate of 60 kbps. Even after the addition of error coding to protect the information, for example repetition coding or a simple block code, the overhead is minimal. Similarly, the format information would typically only require a few bits, perhaps 10.

The, average delay for packet transmission will not in practice be increased since resources are allocated more efficiently. Also, the minimal extra power cost to a MS 110 of transmitting the header 302 is at least partly offset by other savings in power in a system in which packet channel availability is signalled. One saving comes from a reduction in the time for which a MS 110 has to monitor the system before attempting access. Another saving comes because the MS 110 only has to transmit the format information once, in the header 302, instead of repeatedly while the data packets 214 are transmitted.

Figure 5:
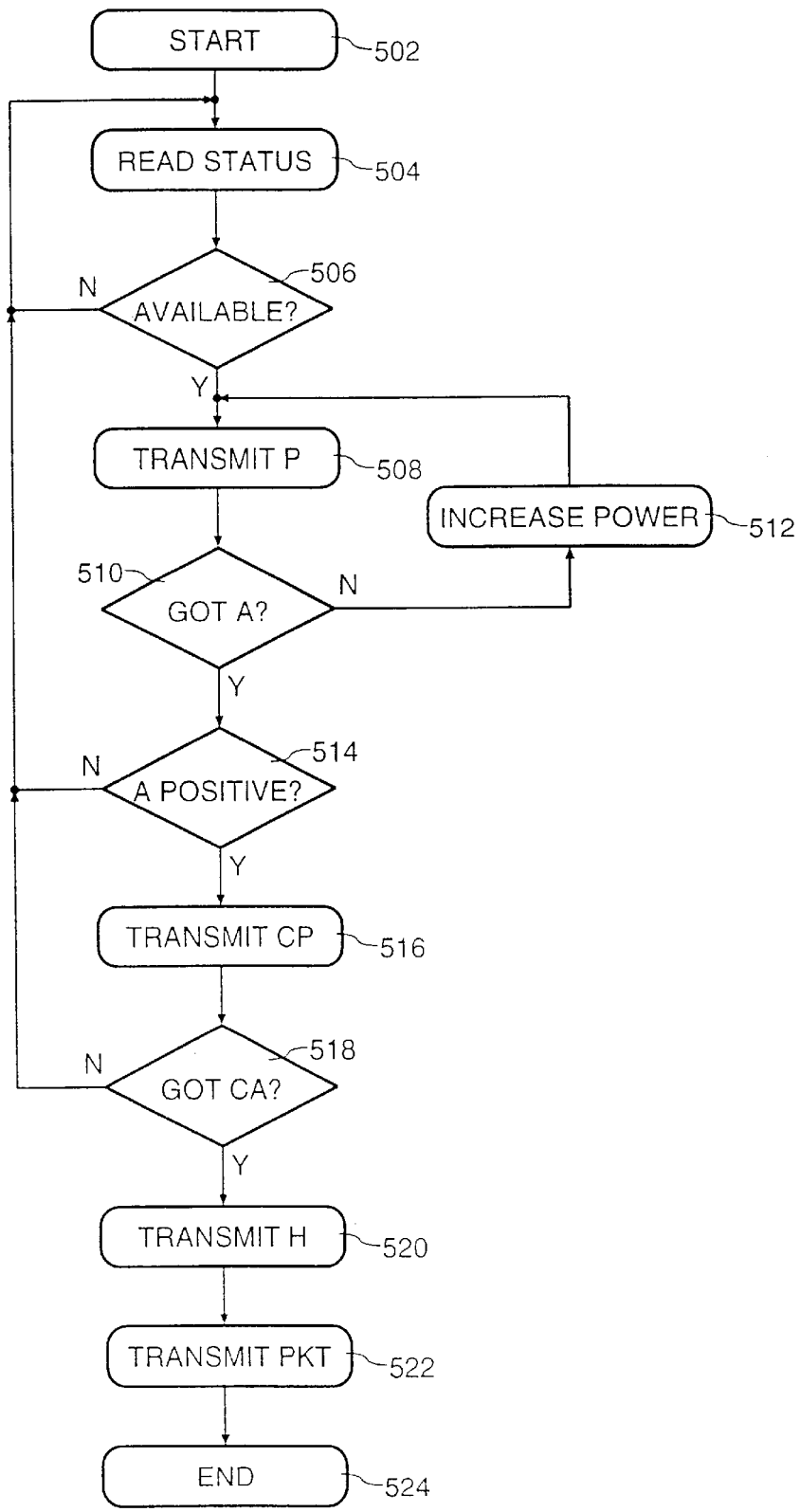
FIG. 5 is a flow chart illustrating a method in accordance with the present invention for transmitting a packet header on a random access packet channel.

A flow chart summarizing a method in accordance with the present invention for a MS 110 broadcasting a packet header 302 is shown in FIG. 5. The method starts, at step 502, with a MS 110 having data for transmission on the random access packet channel. The MS 110 receives, at step 504, the AV message 402 which gives information on available resources (for example channels and/or bit rates).

The MS 110 determines, at step 506, whether the required resource is available. If it is not, then the process restarts at step 504. If the available bit rate is sufficient, the MS 110 can proceed. Before proceeding the MS 110 may wait for a short random back-off period, preferably of up to one frame, to reduce the probability of excessive collisions if a number of MSs 110 simultaneously determine that the same resource is free.

When it proceeds, the MS 110 selects an available resource and sets its transmission power to a minimum power level. The MS 110 then transmits, at step 508, an access preamble 202 encoded using a signature corresponding to the selected resource. Next the MS 110 determines, at step 510, whether it has received an acknowledgement 206 from the BS 100. If no acknowledgement is received the MS 110 increases its transmission power, at step 512, and returns to step 508. If an acknowledgement is received the MS 110 determines, at step 514, whether the acknowledgement was positive, in which case the process continues, or negative, in which case the MS 110 waits for a random back-off period and returns to step 504.

Next the MS 110, at step 516, transmits a contention resolution preamble 208 using a randomly selected signature. The BS 100 acknowledges at most one of the contention resolution preambles 208 and, if appropriate, at the same time indicates the channelisation code for the PCCH 212 and the scrambling code for the uplink packet channel. Finally, the MS 110 determines, at step 518, whether it received a contention resolution acknowledgement 210 from the BS 110. If a CA 210 was received the MS 110 is able to proceed to transmit, at steps 520 and 522, its packet header 302 and data packets 214 on the assigned channel, after which the method ends at step 524. If no CA 210 was received, the MS 110 waits for a random back-off period and returns to step 504. In this case it is preferable for the MS 110 to keep its transmission power set to the same level as that for the original preamble 202 that appeared to be acknowledged by the BS 100.

The present invention also has applications, to other random access channel schemes. In general, it is applicable to any such scheme where a MS 110 is allowed to transmit data having a duration longer than one frame (10 ms in UMTS).

As well as its application in a FDD system as described above, the present invention could be applied in other types of communication system. For example, it could be used in a Time Division Multiple Access (TDMA) system provided that the uplink transmissions take place in different time slots to the downlink transmissions:

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
   a primary station;
   a secondary station; and
   a random access channel for a transmission of data from said secondary station to said primary station,
   wherein said secondary station includes means for transmitting, after receiving at least one acknowledgement from said primary station of a request for the random access channel by said secondary station and before transmitting the data on said random access channel, a message including an indication of a quantity of data to be transmitted via said random access channel to said primary station, and
   wherein said primary station includes means for determining from the received message when the data transmission by said secondary station will end.

2. The system as claimed in claim 1, wherein said random access channel is adapted for transmission of data in packets.

3. A primary station for use in a radio communication system having a random access channel for the transmission of data from a secondary station to said primary station, said primary station comprising:
   means for receiving from the secondary station, after transmitting at least one acknowledgement of a request by the secondary station for the random access channel and before receiving the data on the random access channel, a message including an indication of a quantity of data to be transmitted via the random access channel to said primary station; and
   means for determining from the received message when the data transmission by the secondary station will end.

4. The primary station as claimed in claim 3, further comprising:
   means for transmitting a control channel, including power control information, during data transmission by the secondary station and for ending transmission of the control channel at the indicated end of the data transmission by the secondary station.

5. The primary station as claimed in claim 3, further comprising:
   means for assigning a random access channel resource to the secondary station while the random access channel resource is in use based on a determination that the random access channel resource will be available by a time that the secondary station has completed its request for the use of the random access channel resource.

6. The primary station as claimed in claim 3, further comprising:
   means for signaling an availability of random access channel resources to a plurality of secondary stations; and
   means for signaling an availability of a random access channel resource that is currently in use but which will be available by time that the secondary station has completed a request for use of the random access channel resource.

7. A secondary station for use in a radio communication system having a random access channel for the transmission of data to a primary station, said secondary station comprising:
   means for forming a message including an indication of a quantity of data to be transmitted to the primary station; and
   means for transmitting the message to the primary station after receiving at least one acknowledgement from the primary station of a request for the random access channel by said secondary station and before transmitting the data on the random access channel.

8. The secondary station as claimed in claim 7, further comprising:
   means for including format information relating to the data transmission in the message.

9. A method of operating a radio communication system having a random access channel for the transmission of data from a secondary station to a primary station, the method comprising:
   operating the secondary station to transmit, after receiving at least one acknowledgement from the primary station of a request for the random access channel by the secondary station and before transmitting the data on the random access channel, a message including an indication of quantity of data to be transmitted by the secondary station to the primary station via the random access channel; and
   operating the primary station to receive the message and to determine from the received message when the data transmission by the secondary station will end.

10. The method as claimed in claim 9, wherein the secondary station includes format information relating to the data transmission in the message.

11. The method as claimed in claim 9, further comprising:
    operating the primary station to transmit a control channel, including power control information during data transmission by the secondary station; and
    operating the primary station to end transmission of the control channel at the indicated end of the data transmission by the secondary station.

12. The method as claimed in claim 9, further comprising:
    operating the primary station to signal an availability of random access channel resources to a plurality of secondary stations;
    operating the secondary station to request a random access channel resource; and
    operating the primary station to signal an availability of the random access channel resource when the random access channel resource is in use during a time of the request for use of the random access channel resource but will be available by a time that the secondary station has completed the request for use of the random access channel resource.

* * * * *